XR 3,834,790

United States Patent [19]
Macken

[11] 3,834,790
[45] Sept. 10, 1974

[54] CUMULATIVE OPTICAL FREQUENCY SHIFTER

[75] Inventor: John A. Macken, Orange, Calif.

[73] Assignee: Rockwell International Corporation, El Segundo, Calif.

[22] Filed: June 28, 1972

[21] Appl. No.: 266,929

[52] U.S. Cl.................. 350/157, 307/88.3, 356/112, 250/199, 331/94.5 C, 331/94.5 S, 331/94.5 N
[51] Int. Cl. ............................................. G02b 1/24
[58] Field of Search...... 331/94.5 C, 94.5 S, 94.5 N; 307/88.3; 356/112; 350/150, 157, 160; 250/199; 332/7.51

[56] References Cited
UNITED STATES PATENTS

| 3,327,243 | 6/1967 | Stickley | 250/199 |
| 3,409,819 | 11/1968 | Soffer | 350/157 |
| 3,422,370 | 1/1969 | Collins, Jr. | 356/112 |
| 3,443,858 | 5/1969 | Russa | 350/157 |
| 3,569,996 | 3/1971 | Goell | 307/88.3 |
| 3,609,001 | 9/1971 | Weber | 307/88.3 |
| 3,662,183 | 5/1972 | Ashkin | 307/88.3 |

Primary Examiner—Ronald L. Wibert
Assistant Examiner—Michael J. Tokar
Attorney, Agent, or Firm—H. Frederick Hamann; Rolf M. Pitts; George Jameson

[57] ABSTRACT

A means for obtaining large cumulative high optical frequency shifts at efficient microwave driving power levels utilizing Fabry-Perot interferometers.

17 Claims, 4 Drawing Figures

CUMULATIVE OPTICAL FREQUENCY SHIFTER

The invention herein described was made in the course of or under a contract or subcontract thereunder, with the United States Navy.

BACKGROUND OF THE INVENTION

1. Field of the Invention:

The present invention relates to an optical frequency shifter and, more particularly, to a means for obtaining very high frequency shifts at low efficient power driving levels.

2. Description of Prior Art:

It is often necessary or desirable to shift the frequency of a beam of light over a wide frequency range. For example, a convenient technique for constructing a laser radar system is to compare the returning optical beam, shifted in frequency by the moving target in accordance with the well known Doppler effect, with the emitted beam by mixing them together and looking at the beat frequency. A problem exists, however, in using an optical laser Doppler radar over a large range of velocities such as would occur for a high speed jet aircraft, a missile, or a satellite. Anticipated targets may have relative velocities anywhere between a fraction of a ft./sec. and approximately ±20,000 ft./sec. Heterodyne detection of the return beam with a portion of the emitted beam would generate a Doppler signal between a few kHz. and 1.5 gHz. Such a high frequency signal exceeds the bandwidth of available detectors. As a result, it becomes necessary to reduce the detected signal to a more manageable value by shifting the frequency of that portion of the laser beam used for a heterodyning reference to a value close to the frequency of the return beam. For such a scheme to be practical, the reference beam must be shifted by a precisely known amount and selection of the frequency shift must be made very rapidly so that unacceptable time delays are not introduced into the laser radar system.

Many methods for shifting the frequency of a beam of light have been proposed. In order to be of extensive use, the frequency shifter must be capable of operation over a wide frequency range from a few Hz. to several gHz. This is clearly not obtainable with mechanical methods.

In U.S. Pat. No. 3,527,532, issued Sept. 8, 1970, entitled "Digital Optical Frequency Shifter," by J. A. Macken, which application is assigned to North American Rockwell Corporation, the assignee of the present invention and now known as Rockwell International Corporation, there is described a digital optical frequency shifter wherein the frequency of a beam of light is shifted in a stepwise manner by transmitting the beam of light serially through a plurality of rotating half-wave plates or electro-optic crystals which simulate rotating half-wave plates. A stepwise addition or subtraction of frequencies in increments determined by the rotation rate of the half-wave plates results. Even though this previous patent described how to obtain an optical frequency shift, there was no mention of the practical problems encountered in obtaining very high frequency shifts, for example, frequency shifts of one GHz would require several hundred watts of driving power. Therefore, a need exists for a method for more efficiently coupling the microwave driving power to produce a high optical frequency shift.

The technique used in applicant's device improves the state of the art in that there is described a means for obtaining high optical frequency shifts at lower driving power levels.

SUMMARY OF THE INVENTION

According to the present invention, a unique approach to the problem of shifting the frequency of a beam of light over a wide range is formulated. The invention uses just one frequency shifter in a unique technique for sending the light through this frequency shifter several times until sufficient frequency shifts have been accumulated to reach the desired frequency. At this point, this new frequency is transmitted out of the frequency shifter.

Frequency shifting components are combined with the unique characteristics of the Fabry-Perot interferometer. Two such interferometers are used, one designated the tilted interferometer and the other, the accumulating interferometer. The tilted interferometer is designed to separate the output beam from the input beam by choosing a thickness which will transmit the input frequency while reflecting the output frequency. The accumulating Fabry-Perot interferometer recirculates the light through the frequency shifter to build up accumulative frequency shifts, the process continuing until the accumulative frequency shift produces a new frequency equal to the next highest transmission region of the accumulating interferometer. At this point the light is transmitted through the accumulating interferometer and strikes the tilted interferometer. The frequency is now such that it is reflected from the tilted interferometer thereby separating it from the frequency shifter to produce an output.

The voltage applied to the frequency shifter of the present invention is only one-half of the voltage required to produce a complete frequency shift as described in the above referenced digital optical frequency shifter of U.S. Pat. No. 3,527,532.

It is, therefore, an object of this invention to provide a new and novel method for obtaining high optical frequency shifts.

It is another object of the present invention to provide an improved method for more efficiently coupling the microwave driving power to produce high optical frequency shifts.

These and additional objects of the present invention will become more apparent when taken in conjunction with the following description and drawings in which like characters indicate like parts.

DESCRIPTION OF THE PREFERRED EMBODIMENT

Figure 1:
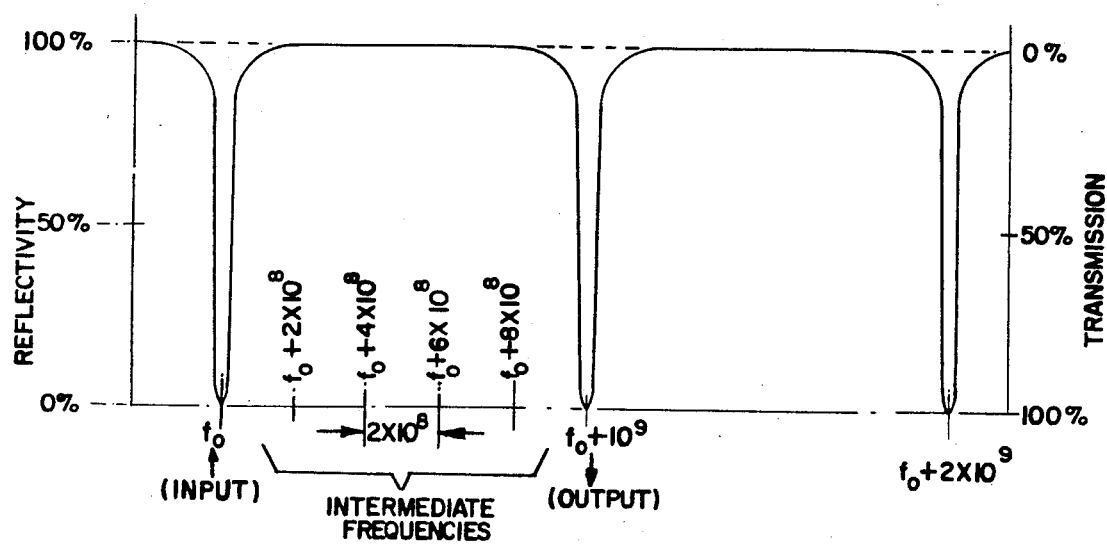
FIG. 1 presents the spectral reflectivity of a Fabry-Perot interferometer.

FIG. 1 presents a plot of the reflectivities of a Fabry-Perot interferometer as a function of wave length. The curve was taken for the case of two parallel partial transmitting reflectors, each of 90 percent reflectivity and 10 percent transmission. It can be seen from this figure that at certain wave lengths the Fabry-Perot interferometer has zero reflectivity and is completely transparent, while in other wave lengths it is nearly perfectly reflecting. For instance, frequencies $f_o$, $f_o + 10^9$, and $f_o + 2 \times 10^9$ of FIG. 1 are minimum reflectivity, or maximum transmission frequencies. These transmission spikes can be varied both as to their individual width and their relative separation one from the other. A change in the separation between the reflectors changes the separation one from the other of the regions of high transmission, while a change in the mirror reflectivity changes the width of the individual transmission regions. The formula for the operation of the transmission regions one from the other is given as:

$$\Delta f = c/2l$$

where $\Delta f$ is the separation in frequency between the center of the spikes of the transmission regions, $l$ is the separation of the parallel plates in the Fabry-Perot interferometers, and $c$ is the speed of light. For the example shown by FIG. 1, $l$ is 6 inches and $\Delta f$ = 1GHz.

Figure 2A:
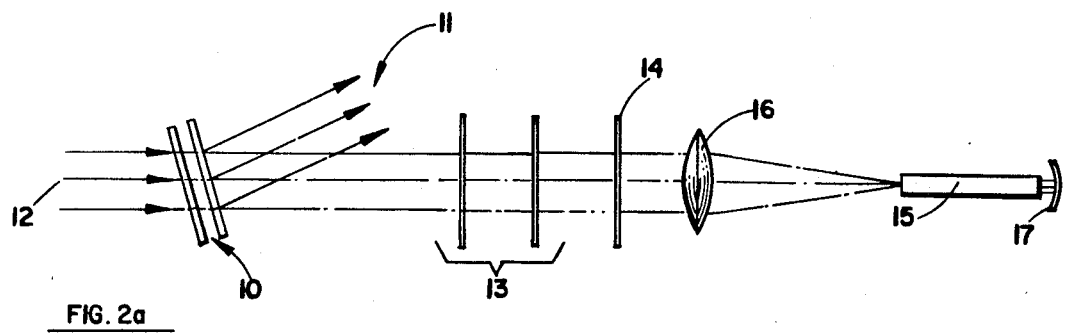
FIG. 2a presents one embodiment illustrating the optical alignment for applicant's invention.
Figure 2B:
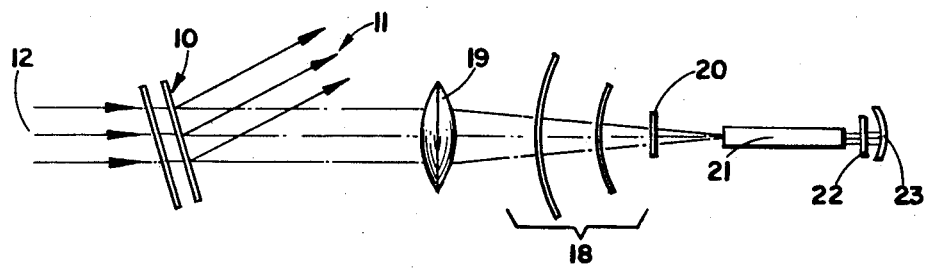
FIG. 2b is a representation of a second optical arrangement for applicant's invention.

FIGS. 2a and 2b illustrate how the Fabry-Perot interferometer can be combined with the frequency shifter to obtain large cumulative frequency shifts. In each of these figures, two Fabry-Perot interferometers are shown, with one designated the tilted and the other the accumulating interferometer. The tilted interferometer is designed to separate the output beam 11 from the input beam 12. This is accomplished by choosing a thickness which will transmit the input frequency while reflecting the output frequency.

The accumulating interferometer in each of these figures is the one responsible for recirculating the light through the frequency shifter to build up a cumulative frequency shift.

In consideration of FIG. 2a, and assuming that the input 12 is a parallel laser beam, it is seen that the laser beam first passes through the tilted Fabry-Perot interferometer 10 and then passes through the accumulating Fabry-Perot interferometer 13 which has a region of high transmissions at this frequency, as shown in FIG. 1. The beam then passes through a properly oriented quarter wave plate 14 which converts the plane polarized light beam to circularly polarized light. The light is then focused into the narrow frequency shifting crystal 15 by the lens 16.

After passing through the frequency shifter 15, the light then hits curved mirror 17 which refocuses the light and passes it back through the frequency shifter crystal 15. To minimize the driving voltage of the frequency shifter 15, the depths of focus of the lens 16 and the mirror 17 are chosen such that they are equal to the optical path length of the frequency shifter 15. The light then retraces its path back through the lens 16, quarter wave plate 14, and then strikes the accumulating interferometer 13. Since the light has obtained one complete frequency shift in twice passing through the frequency shifter 15, we now have a situation where the light is no longer transmitted by the accumulating interferometer 13 but is reflected as illustrated in the transmission and reflection characteristic curve of FIG. 1. Therefore, the light is reflected from the accumulating interferometer and retraces its path through the frequency shifter 15 to the curved mirror 17 and back again to the accumulating interferometer 13. This new frequency is also reflected by the accumulating interferometer 13. This process continues until a cumulative frequency shift is obtained sufficiently large that a new frequency equal to the next highest transmission region of the accumulating interferometer 13 is obtained. At this point the light is transmitted through the accumulating interferometer and strikes the tilted interferometer 11. The frequency of the beam is now such that it is reflected from the tilted interferometer 10, producing the output 11.

It is thus seen that, to obtain a frequency shift of 1 GHz, the frequency shifter 15 can be driven at some fraction of the desired frequency. For example, a driving frequency of 200 MHz would require 5 cumulative frequency shifts for a total of 1 GHz to be obtained. From FIG. 1, it is seen that the accumulating interferometer 13 is reflective for all the intermediate frequencies but transmits the light once it has reached a total shift of 1 GHz. Further, as described in U.S. Pat. No. 3,527,532 discussed above under "Description of Prior Art," the voltage applied to the frequency shifter 15 is one-half the voltage required to produce a complete frequency shift. Therefore, it is seen that using this technique the driver unit needs only to put out a factor of 5 lower frequency and a factor of 2 lower voltage.

Turning now to FIG. 2b, there is illustrated an alternative arrangement which will reduce the driving frequency by a factor of 10 with no reduction of the voltage for the above described arrangement from FIG. 2a.

As shown in FIG. 2b, the light passes through the tilted interferometer 10 and then is focused into the curved accumulating interferometer 18 by the lens 19. Interferometer 18 is comprised of two circularly curved partially transmitting reflectors with a common center at the focal point of the lens 19. The spacing between these curved reflectors is selected such that the input light falls in one of the transmission regions of the interferometer. After passing through interferometer 18, the light passes through quarter wave plate 20, through frequency shifter 21, through an additional quarter wave plate 22, and finally is reflected by curved mirror 23 which sends the light back through the series to accumulating interferometer 18. As in the previous arrangement, the accumulating interferometer continues to reflect the frequency shifted light until a new frequency is reached equal to a transmission region of the interferometer. Further, as in the previous arrangement, to minimize the driving voltage of the frequency shifter 21, the depths of focus of the lens 19 and the curved mirror 23 are equal to the optical path length of the frequency shifter. At this point, the light is transmitted through the interferometer 18, through the lens 19, and is reflected by the tilted interferometer 10 to provide output 11.

The basic difference between the arrangement presented by FIG. 2a and FIG. 2b lies in the amount of frequency shift that the frequency shifter gives in one pass. In the FIG. 2a arrangement, there was only sufficient voltage to produce one quarter wave length retardation in a single pass through the frequency shifter; therefore, a double pass was required to produce a complete frequency shift. In the arrangement shown by FIG. 2b, the voltage used would be twice as large as that required for FIG. 2a, but a complete frequency shift would be obtained in only one pass through the frequency shifter. Therefore, the driving frequency for this device needs only be half the driving frequency required for the arrangement in FIG. 2a. However, an additional quarter wave length plate is required in the FIG. 2b arrangement to put the light in the proper circular polarization to obtain a cumulative effect.

Another difference between the arrangements of these two figures is the type of accumulating Fabry-Perot interferometer used. Actually, the flat or curved interferometer would work equally well with either arrangement and could be interchanged. The flat interferometer 13 in the embodiment of FIG. 2a requires parallel or collimated light, however, so lens 16 must be placed between the interferometer 13 and the frequency shifting crystal 15. However, in the embodiment of FIG. 2b no lens is required between the curved Fabry-Perot interferometer 18 and the frequency shifter 21 since the interferometer 21 requires a converging input light beam.

The major advantage of utilizing a tilted interferometer is that it does not waste any light. However, this high efficiency is obtained at the cost of the complexity of manufacturing and aligning the tilted Fabry-Perot interferometer. Another embodiment would be to replace the tilted interferometer with a 50 percent beam splitter, in other words, eliminating one of the two mirrors shown in FIG. 2a for the tilted interferometer 10. This would accomplish the task of separating the output beam with greater simplicity than with the use of a tilted interferometer. However, the use of a 50 percent beam splitter would introduce a total loss of 75 percent since there would be a 50 percent loss of the input radiation and a 50 percent loss of the output radiation. Normally this 75 percent loss would not be important since one usually desires to use the frequency shifted light as a local oscillator beam in a laser radar system and the optimum powers usually are a few milliwatts.

The tilted Fabry-Perot interferometers could also be replaced by an optical isolator, said optical isolator being well known to those skilled in the art. The optical isolator has the property whereby it will transmit light entering from one side while reflecting light entering from the opposite direction. The optical isolator, like the tilted Fabry-Perot interferometer, has nearly 100 percent transmission efficiency, however, its complexity would have to be warranted by the need for high transmission efficiency.

Figure 3:
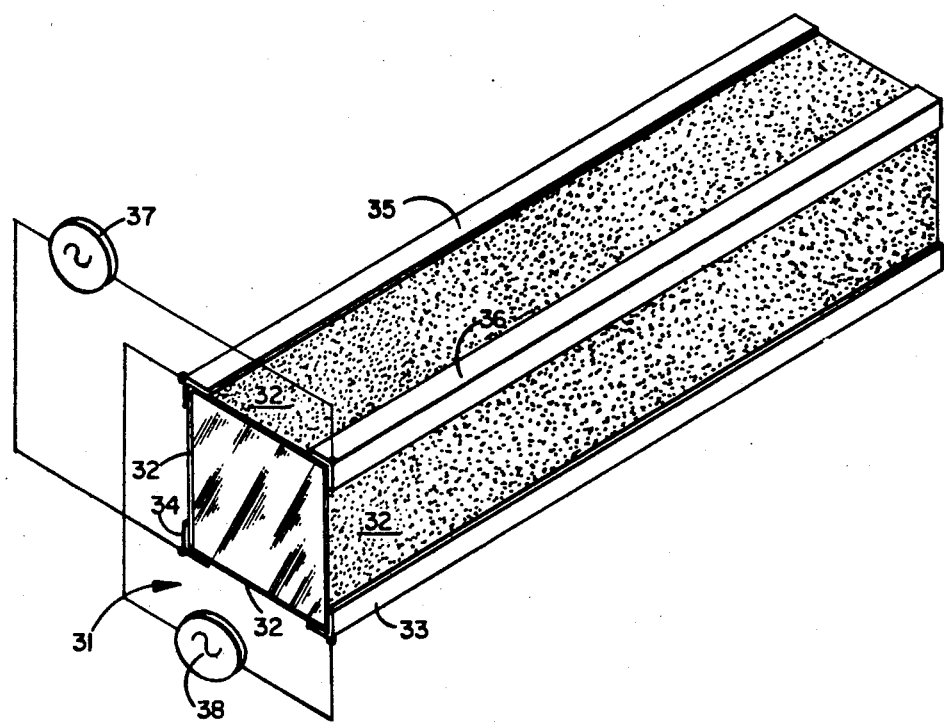
FIG. 3 presents a type of frequency shifter suitable for use with applicant's invention.

FIG. 3 presents one embodiment of a frequency shifter as shown in U.S. Pat. No. 3,527,532 which is of a type suitable for use with applicant's invention. The frequency shifter of FIG. 3 simulates a rotating half-wave plate by the application of electric fields to a stationary electro optic crystal so as to produce the same birefringent rotation characteristics of a rotating half wave plate.

The principle employed makes use of the polarization properties of light in electro optic crystals. Plane polarized light can be thought of as consisting of two superimposed beams of counter-rotating polarized circulating polarized light, both rotating at the same frequency. In addition, a beam of plane polarized light which has its plane of polarization slowly rotating can be thought of as consisting of two superimposed beams of counter-rotating circularly polarized light which are rotating at slightly different frequencies. The difference in the frequency of rotation is equal to the rotation rate of the rotating plane polarized light beam.

If a beam of plane polarized light which has a stationary plane of polarization is passed through a rotating half wave plate there emerges a rotating plane polarized beam wherein the rotational frequency of the rotating half wave plate has been mixed with the light beam and one circularly polarized component has been shifted up in frequency and the other component has been shifted down in frequency.

If the rotating plane polarized beam of light is now passed through a second half wave plate which is rotating in the opposite direction as the first half wave plate, there is an additive effect on the rotation rate of the plane polarized light beam and the emergent beam of light will be rotating at a rate which is the sum of the rates provided by the individual half wave plates. Under these circumstances, the frequency shifts provided by the two rotating half wave plates have been added.

Application of electric fields to the stationary electro optic crystal 31 of FIG. 3 will produce the same birefringent rotation characteristics of a rotating half wave plate. The crystal 31 is covered on four sides thereof with a high resistance film 32 such as vapor deposited indium. A plurality of low resistance conducting strips 33 through 36 are then laid down along each corner of crystal 31 so as to make electrical contact with the high resistance film along the length of the edges. The first high frequency generator 37 is coupled via a pair of leads and high conductivity contacts to opposite conducting strips 34 and 36. Similarly, a second high frequency generator 38 is connected to opposite conductor strips 33 and 35. Generators 37 and 38 generate signals which are equal in frequency but 90° out of phase. As electrodes 33 through 36 are driven by generators 37 and 38, high resistance film 32 provides a linear voltage drop between the corners of crystals 31 which provides that any field fringing effect is substantially eliminated. With this configuration, the whole aperture of crystal 31 can be used which therefore reduces the required width of crystal 31, thus reducing the required voltages from generators 37 and 38.

Additional explanation of the operation of electro optic crystals as frequency shifting optical mixers may be obtained by reference to an article entitled "Electro Optic Light Modulation with Cubic Crystals," by C. F. Buhrer et al, Applied Optics, Aug. 1963, Vol. 2, No. 8, pp 839–846.

Applicant's invention, therefore, provides a means for obtaining large cumulative high optical frequency shifts at efficient microwave driving power levels utilizing Fabry-Perot interferometers.

It will be manifest that many changes and modifications may be made to applicant's invention without departing from the essential spirit thereof. It is intended, therefore, in the annexed claims, to cover all such changes and modifications as may fall within the true scope of the invention.

What is claimed is:

1. An apparatus for shifting the input frequency of a beam of light over a wide range, said apparatus comprising:
    a frequency shifter being responsive to the application of a beam of light for shifting the frequency of the beam of light by a predetermined increment; and
    means for recirculating the beam of light through said frequency shifter a plurality of times until sufficient incremental frequency shifts have accumulated to provide a desired output frequency, said recirculating means comprising:

first means for transmitting with a plane polarization and in a first direction the beam of light entering from a second direction with a plane polarization and at the input frequency, and for reflecting back in the first direction the beam of light returning from the first direction after being shifted in frequency by said frequency shifter;

second means for converting the plane polarized beam of light from the second direction into a circularly polarized beam of light for application to said frequency shifter and for converting a circularly polarized beam of light from said frequency shifter into a plane polarized beam of light for application to said first means; and third means responsive to the frequency shifted beam of light from said frequency shifter for reflecting the frequency shifted beam of light back through said frequency shifter and said second means to said first means, said first means recirculating the beam of light toward said third means, the recirculation by said first means and reflection by said third means continuing until sufficient incremental frequency shifts of the frequency of the beam of light have accumulated to produce the desired output frequency, at which time said first means retransmits the beam of light.

2. The apparatus of claim 1 wherein:

said second means comprises a quarter wave plate being responsive to the beam of light from said first means for converting plane polarized light into circularly polarized light, and a lens for focusing the beam of light received from said quarter wave plate into said frequency shifter; and said third means comprises a curved mirror being responsive to the beam of light from said frequency shifter for reflecting the beam of light back through said frequency shifter, said lens and said quarter wave plate to said first means, said first means recirculating the beam of light back through said frequency shifter to said curved mirror until the desired output frequency is obtained.

3. The apparatus of claim 2 wherein said first means comprises an accumulating Fabry-Perot interferometer comprising two parallel partially transmitting reflectors.

4. The apparatus of claim 1 wherein:

said second means comprises a first quarter wave plate interposed between said first means and a first side of said frequency shifter for converting the plane polarized beam of light from said first means into the circularly polarized beam of light for application to said first side of said frequency shifter and for converting circularly polarized light from said first side of said frequency shifter to plane polarized light for application to said first means; and said third means comprises a second quarter wave plate positioned at a second side of said frequency shifter for converting the frequency shifted circularly polarized beam of light from said frequency shifter into a plane polarized beam of light in the first direction and for converting a plane polarized beam of light from the first direction into a circularly polarized beam of light for application to said frequency shifter and a curved mirror responsive to the beam of light from said second quarter wave plate for reflecting said beam of light back through said second quarter wave plate, said frequency shifter and said first quarter wave plate to said first means, said first means recirculating the beam of light back through said frequency shifter to said curved mirror until the desired output frequency is obtained.

5. The apparatus of claim 4 wherein said first means is a curved accumulating Fabry-Perot interferometer comprising two curved partially transmitting reflectors configured as arcs of concentric circles and said apparatus further comprises a lens positioned before said first means for focusing the beam of light entering from the second direction through said first means and said first quarter wave plate into said frequency shifter.

6. The apparatus of claim 3 further comprising a tilted Fabry-Perot interferometer comprising two parallel partially transmitting reflectors tilted at an angle from the perpendicular to the beam of light, said tilted inferometer being disposed in the light path of the beam of light prior to said first means for transmitting the beam of light at the input frequency to said first means and for separating from the light path the frequency shifted beam of light being transmitted from said first means at the desired output frequency.

7. The apparatus of claim 5 further comprising a tilted Fabry-Perot interferometer comprising two parallel partially transmitting reflectors tilted at an angle from the perpendicular to the beam of light, said tilted interferometer being disposed in the light path of the beam of light prior to said lens for transmitting the beam of light at the input frequency through said lens to said first means and for separating from the light path the frequency shifted beam of light being retransmitted from said first means at the desired output frequency.

8. An apparatus for shifting the frequency of a beam of light comprising:

a tilted Fabry-Perot interferometer comprising two parallel partially transmitting reflectors tilted at an angle from the perpendicular to the beam of light for transmitting the beam of light entering said tilted interferometer from a first direction at a preselected input frequency and for reflecting a beam of light approaching said tilted interferometer from a second direction at a preselected output frequency;

an accumulator Fabry-Perot interferometer comprising two parallel partially transmitting reflectors perpendicular to the beam of light for transmitting in a second direction the beam of light at the input frequency received from said tilted interferometer and for sequentially reflecting the beam of light approaching said accumulating interferometer from the second direction until the beam of light is frequency shifted a desired total amount at which time the beam of light at the preselected output frequency is retransmitted back to said tilted interferometer;

a circular polarizer for converting the light received from said accumulating interferometer into a circularly polarized beam of light and for converting circularly polarized light received from the second direction into plane polarized light for application to said accumulating interferometer;

a lens for focusing said circularly polarized beam of light received from said quarter wave plate;

a frequency shifter being responsive to the focused light from said lens for shifting the frequency of the focused beam of light by a predetermined increment of frequency; and a mirror responsive to the frequency shifted beam of light from said frequency shifter for reflecting said light back through said frequency shifter, said lens and said quarter wave plate to said accumulating interferometer, said accumulating interferometer recirculating the light back through said frequency shifter to said mirror, said recirculating and reflecting of the light continuing until the desired frequency shift is obtained whereby the light at the preselected output frequency is retransmitted through said accumulating interferometer to said tilted interferometer for reflection therefrom as an output.

9. An apparatus for shifting the frequency of a beam of light comprising:

a tilted Fabry-Perot interferometer comprising two parallel partially transmitting reflectors tilted at an angle from the perpendicular to the beam of light for transmitting the beam of light entering said tilted interferometer from a first direction at a preselected input frequency and for reflecting a beam of light approaching said tilted interferometer from a second direction at a preselected second frequency;

a lens for focusing the beam of light transmitted from said tilted interferometer;

a curved accumulating Fabry-Perot interferometer comprising two curved partially transmitting reflectors configured as arcs of concentric circles with a common center occurring at the focal point of said lens for transmitting in a second direction the beam of light at the input frequency received from said lens and for sequentially reflecting the beam of light approaching said accumulating interferometer from the second direction until the beam of light is frequency shifted a desired total amount at which time the beam of light at the preselected second frequency is retransmitted back through said lens to said tilted interferometer;

a first quarter wave plate receiving the beam of light from said accumulating interferometer;

a frequency shifter for shifting the frequency of the beam of light from said first quarter wave plate by a predetermined increment of frequency and for shifting the frequency of light received from the second direction by the predetermined increment of frequency;

a second quarter wave plate receiving the beam of light from said frequency shifter; and a curved mirror responsive to the beam of light from said second quarter wave plate for reflecting said beam of light back through said second quarter wave plate, said frequency shifter and said first quarter wave plate to said accumulating interferometer said accumulating interferometer recirculating the beam of light back through said first quarter wave plate, said frequency shifter and said second quarter wave plate to said curved mirror, said recirculating and reflecting continuing until the desired frequency shift is obtained whereby the light at the preselected second frequency is retransmitted through said accumulating interferometer and said lens to said tilted interferometer for reflection therefrom as an output.

10. The apparatus of claim 1 further comprising:
fourth means for separating the beam of light being retransmitted from said first means at the desired output frequency from the beam of light at the input frequency by transmitting the beam of light at the input frequency in the first direction toward said first means while reflecting the beam of light at the output frequency as an output, 11. The apparatus of claim 10 wherein said first and fourth means are Fabry-Perot interferometers, each comprising two parallel partial transmitting reflectors with said fourth means tilted at an angle from the perpendicular to the beam of light.

12. The apparatus of claim 10 wherein said fourth means ia a Fabry-Perot interferometer comprising two parallel partial transmitting reflectors and tilted at an angle from the perpendicular to the beam of light, and said first means is a Fabry-Perot interferometer comprising two curved partial transmitting reflectors, said curved reflectors configured as arcs of concentric circles.

13. An optical frequency shifter comprising:

first means for transmitting in a first direction a beam of light entering from a second direction at an input frequency and for reflecting in a third direction a beam of light entering from the first direction at a predetermined output frequency;

second means for transmitting in the first direction the beam of light transmitted from said first means, for reflecting back in the first direction any beam of light entering from the first direction at a frequency different than the predetermined output frequency, and for retransmitting to said first means a beam of light entering from the first direction at the predetermined output frequency;

third means responsive to each beam of light from said second means for reflecting said beam of light back toward said second means;

fourth means, interposed between said second and third means, being responsive to each beam of light passing therethrough from said second means to said third means and being reflected therethrough from said third means back to said second means for shifting the frequency of said beam of light by a predetermined frequency increment; and fifth means interposed between said second and fourth means for converting the light from said second means into circularly polarized light and for converting the light from said fourth means into plane polarized light.

14. The optical frequency shifter of claim 13 wherein:

said first and second means are Fabry-Perot interferometers, each comprising two parallel partial transmitting reflectors, with said first means tilted at an angle from the perpendicular to the beam of light;

said third means is a curved mirror;

said fourth means is an incremental frequency shifter; and said fifth means is a quarter wave plate.

15. The optical frequency shifter of claim 13 further including:

means interposed between said fifth and fourth means for focusing the circularly polarized light into said fourth means.

16. The optical frequency shifter of claim 13 further including:

means interposed between said first and second means for focusing into said second means the beam of light transmitted from said first means; and sixth means interposed between said third and fourth means for converting the circularly-polarized frequency-shifted light passing from said fourth means toward said third means into plane-polarized frequency-shifted light and for converting the light reflected from said third means back into circularly polarized light.

17. The optical frequency shifter of claim 16 wherein:

said first means is a Fabry-Perot interferometer comprising two parallel partial transmitting reflectors, with said first means tilted at an angle from the perpendicular to the beam of light;

said second means is a curved Fabry-Perot interferometer comprising two curved partially transmitting reflectors configured as arcs of concentric circles;

said third means is a curved mirror;

said fourth means is an incremental frequency shifter;

said fifth and sixth means are quarter wave plates; and said focusing means is a lens.

* * * * *